Aug. 25, 1964   R. A. HAWLEY   3,145,828
PRODUCT SPACING CONVEYOR
Filed July 12, 1963   4 Sheets-Sheet 1
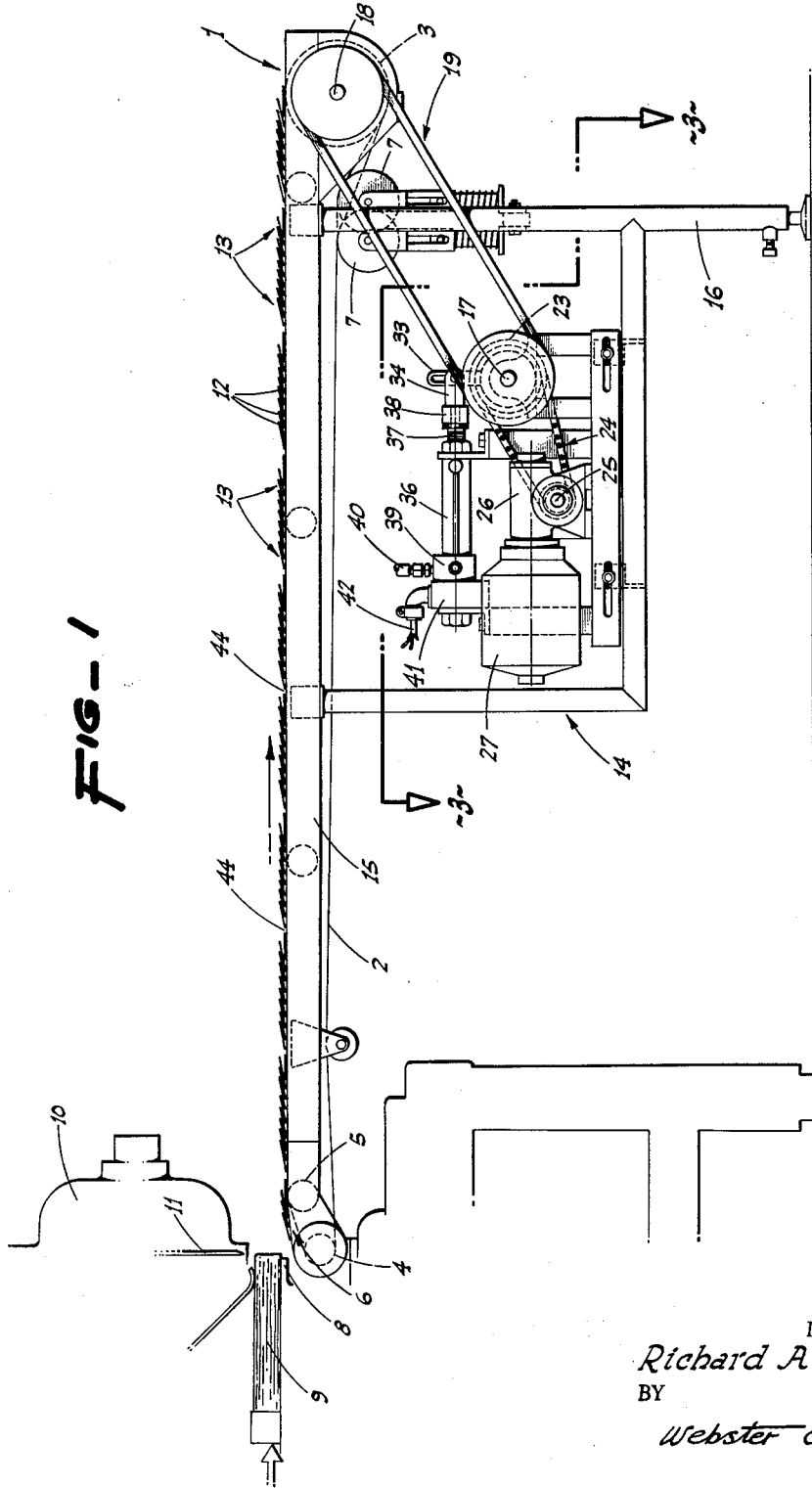
INVENTOR.
Richard A. Hawley
BY
Webster & Webster
ATTYS.

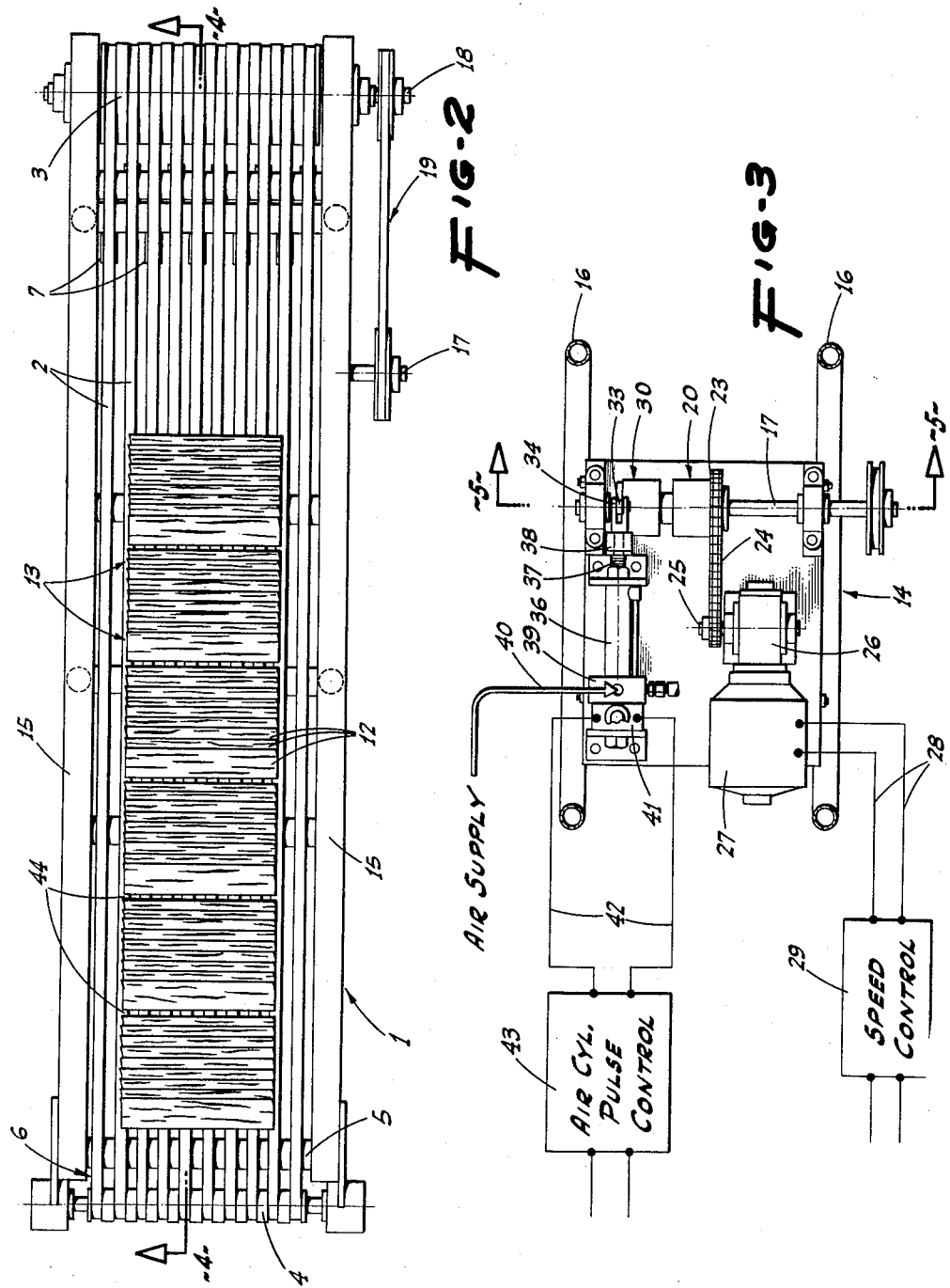

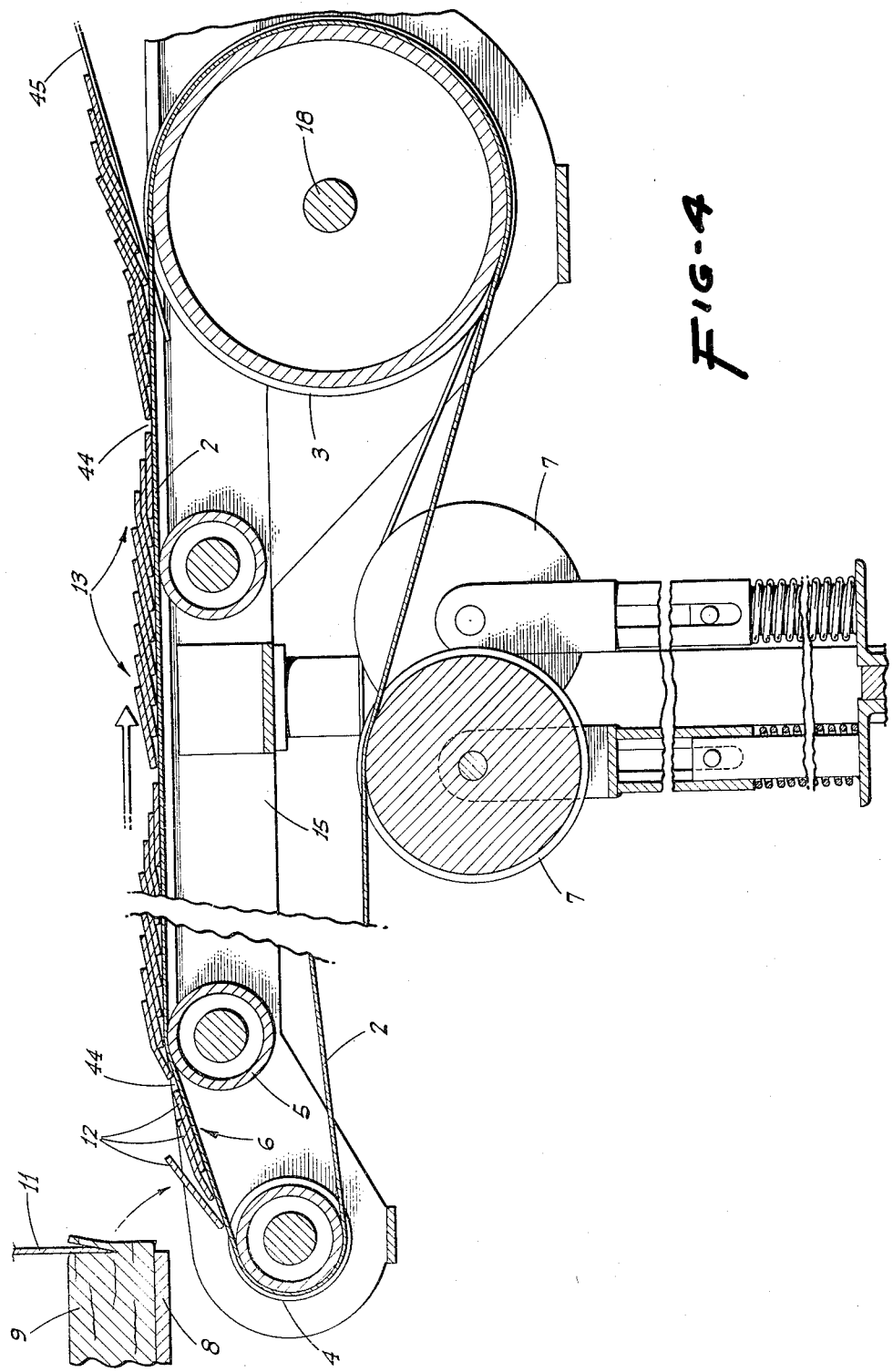

Aug. 25, 1964  R. A. HAWLEY  3,145,828
PRODUCT SPACING CONVEYOR
Filed July 12, 1963  4 Sheets-Sheet 4

United States Patent Office 3,145,828
Patented Aug. 25, 1964

3,145,828
PRODUCT SPACING CONVEYOR
Richard A. Hawley, 2440 Scout Road, Oakland, Calif.
Filed July 12, 1963, Ser. No. 294,606
5 Claims. (Cl. 198—34)

This invention relates to equipment employed in the meat packing industry, and in particular is directed to sliced bacon conveying apparatus of that general type which is arranged to lay out bacon slices, in what is known as "shingled" form, for subsequent packaging.

Apparatus of such type includes, with a bacon slicing machine, an endless conveyor onto the upper run of which the bacon slices, as formed, are deposited in overlapped or shingled relation. If the conveyor is driven at a constant speed and the slicing machine is in constant operation, the slices as deposited in overlapping relation on the conveyor form an unbroken or continuous row thereon, thus making it necessary for the workers to separate the slices into groups of a certain number of slices for individual packaging.

It is, therefore, the major object of this invention to provide the conveyor with automatically functioning means which causes the bacon slices, as received on the conveyor, to be intermittently separated whereby to form longitudinally spaced groups of said slices on such conveyor; each group consisting of a predetermined number of slices which together have a predetermined weight. The subsequent handling of the groups individually, for wrapping or packaging of the same, thus becomes a simple and easy matter.

Another important object of the invention is to provide a conveyor, as above, wherein such automatically functioning means includes, with the conveyor drive shaft which is normally driven at a constant speed, a novel mechanism acting on said shaft at predetermined time intervals to impart a sudden increase in speed to said shaft but for a very short duration, so that the conveyor is in effect "jerked" ahead. A gap is thus recurringly left on the conveyor between a pair of adjacent bacon slices as fed onto the conveyor; the occurrence of the gaps being such that spaced groups of slices, with a predetermined number of slices in each group, are automatically formed on the conveyor. At the same time, such speed increasing mechanism is arranged so that it does not affect or interfere with the functioning of the constant-speed drive means of the shaft and conveyor.

In connection with said speed increasing mechanism, it is a further object of the invention to incorporate a device whereby the extent of the recurrent forward jerking movement of the conveyor, and hence the width of the gaps between the groups of slices, may be adjusted, to suit different conditions of operation, as may be found to be desirable.

A further object of the invention is to provide a product spacing conveyor which is designed for ease and economy of manufacture.

A still further object of the invention is to provide a practical, reliable, and durable product spacing conveyor, and one which is exceedingly effective for the purpose for which it is designed.

These objects are accomplished by means of such structure and relative arrangement of parts as will fully appear by a perusal of the following specification and claims.

In the drawings:

FIG. 1 is a generally diagrammatic side elevation of the improved bacon conveyor, shown in connection with a conventional bacon slicing machine.

FIG. 2 is a stop plan view of the conveyor, showing a plurality of sliced bacon groups thereon in spaced relation.

FIG. 3 is a sectional plan on line 3—3 of FIG. 1; the electrical control devices for the conveyor actuating mechanisms being shown diagrammatically.

FIG. 4 is an enlarged foreshortened elevation of the conveyor, showing the bacon slices as fed onto the conveyor in longitudinally spaced groups.

Figure 5:
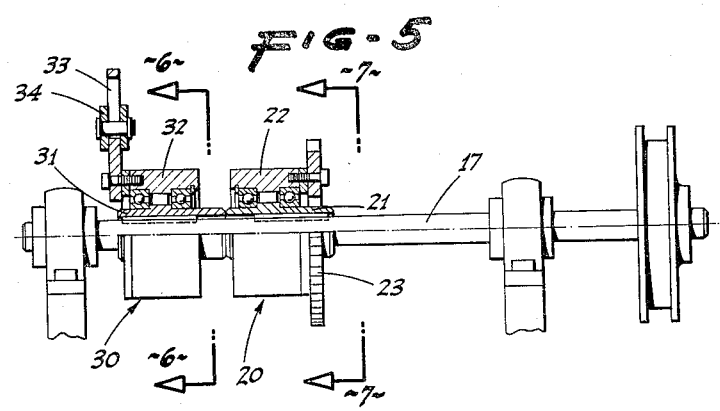
FIG. 5 is a transverse section on line 5—5 of FIG. 3

Referring now more particularly to the drawings and to the characters of reference marked thereon, the conveyor, indicated generally at 1, consists essentially of a plurality of spaced endless and narrow belts 2 mounted on grooved end rollers 3 and 4; the upper run of the belts being maintained horizontal from the roller 3 to a point relatively close to the roller 4 by an idler 5 under the belts, the belts thence sloping down to the roller 4 as clearly shown at 6 in FIG. 4. The belts are held taut by suitably arranged spring-urged tightener units 7 engaging the lower runs of the belts near the roller 3.

A table or platform 8 for the support and advance of a slab or side 9 of unsliced bacon is disposed above and in spaced relation to the roller 4 at the receiving end of the conveyor; such table or platform 8 being part of a conventional bacon slicing machine 10 which includes a power driven knife 11 and suitable means to advance the bacon slab or side 9 step by step on said table or platform 8 in timed relation to operation of such slicing machine. When the slicing machine 10 is in operation, bacon slices 12 are cut in rapid succession; the speed of the conveyor 1 being so related to the speed of said slicing machine 10 that the bacon slices 12, as cut, normally fall onto the upper run of said conveyor flatly and transversely thereof and with said slices in lapped relation lengthwise of said run whereby to provide the desired shingling effect. Such shingling is in a forward direction; i.e., with the exposed and unlapped upper portions of the slices extending toward the discharge end of the conveyor.

When in operation, the slicing machine 10 functions continuously and so that the overlapping bacon slices 12 would, in the absence of the present invention, form a continuous unbroken row on the conveyor. It is desirable, however, when preparing the bacon for packaging, that the slices be deposited on the conveyor in longitudinally spaced groups as shown at 13; each group having a sufficient number of slices to constitute a given weight, such as one pound. Such spacing of the groups 13 greatly facilitates the subsequent handling and wrapping thereof, as will be apparent.

Figure 7:
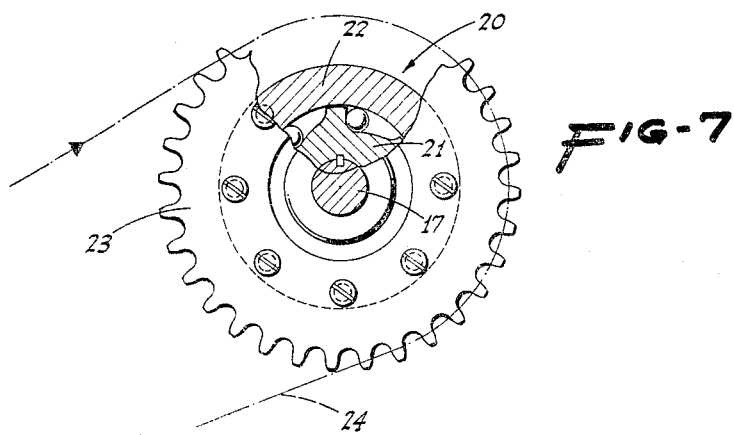
FIG. 7 is a similar view, but taken on line 7—7 of FIG. 5.

This desired end is accomplished by means of the present invention and which includes the mechanism now to be described and which is mounted on a framework 14 depending from the main frame side beams 15 which support the conveyor 1; said framework 14 including floor engaging legs 16 at the end adjacent the roller 3. Such mechanism comprises a countershaft 17 mounted on framework 14 parallel to the axial shaft 18 of roller 3, and connected in driving relation thereto by a belt drive unit 19 disposed outwardly of one of the side beams 15. A normally engaged but overrunning type clutch 20 of a conventional form is mounted on shaft 17 intermediate its ends; such clutch including a central male member 21 fixed on the shaft 17, and a female member 22 freely turnable on male member 21 in a direction contra to the direction of drive of the clutch (see FIG. 7). A sprocket 23 is secured to member 22, and forms part of a chain drive unit 24 which connects said member 22 in driven relation with the output shaft 25 of a reduction gear box 26 operated by an electric motor 27. The circuit 28 of the electric motor has a suitable rheostat or speed control unit 29 interposed therein, so that the speed of the motor 27, and hence of the conveyor 1, may be changed to suit different operating requirements.

Also mounted on shaft 17 is another but normally disengaged or overrunning clutch 30 of the same character as clutch 20, and including a central male member 31 fixed on said shaft 17 and a normally stationary female member 32 in which said member 31 is freely turnable when being driven by shaft 17 from clutch 20.

Figure 6:
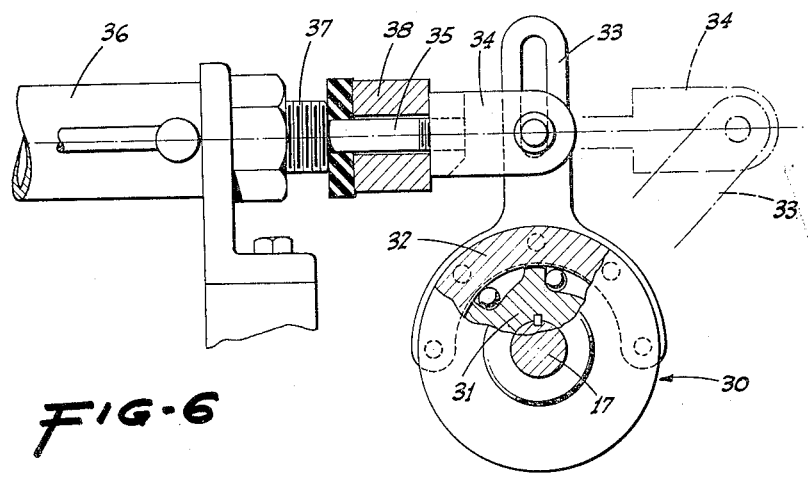
FIG. 6 is a fragmentary enlarged sectional elevation, partly broken out, taken on the line 6—6 of FIG. 5.

A normally upstanding arm 33 rigid with the member 32 is engaged by a clevis 34 projecting from the end of the piston rod 35 of a horizontal, fixed, double acting air operated cylinder 36. (See FIG. 6.) The cylinder 36, at the end from which the rod 35 projects, is provided with a longitudinally adjustable rod-surrounding sleeve 37 which at its outer end engages against the adjacent end of a block 38 disposed on said rod 35 between said sleeve 37 and clevis 34 in initial engagement therewith. By reason of this feature, the piston rod 35 may be pushed ahead some distance by advance of the sleeve without actuation of the piston rod by air pressure. This obviously swings the arm 33 ahead, and reduces the possible extent of pressure-actuated movement of the piston rod and said arm 33. The purpose of this arrangement will be later described.

The control of the flow of air under presure to one end and then the other of the cylinder 36 in successive and rapid order is controlled by an electrically actuated valve 39 of a conventional type interposed in the compressed air supply line 40 leading to the cylinder 36; the valve 39 being in unitary assembly with the cylinder. The electrical actuating unit 41 of the valve 39 is connected to a circuit 42 in which an adjustable timing device 43 of a conventional type is interposed, and which is arranged to both control the movement of the valve 39 so that the air will be admitted to the opposite ends of the cylinder in quick succession, and to control the duration of the time lag between the successive actuating movements of said valve 39.

In operation, with the upper run of the conveyor advancing at a constant and predetermined speed in a direction away from the bacon slicing machine 10, the slices 12—as cut from the bacon slab 9—fall in succession onto said upper run in overlapping or shingled relation as shown; the extent of overlap depending on the speed of the conveyor relative to the cutting speed of the slicing machine.

When the desired number of lapped slices 12 have accumulated on the conveyor to provide a group 13 of a predetermined weight, the timing device 43 at once comes into action and the valve 39 is quickly actuated to cause a sudden advance and then the immediate retraction of the piston rod 35 of the cylinder 36. This, in turn, causes the arm 33 to be swung forwardly, and the clutch 30 to be engaged so as to suddenly part-rotate the shaft 17—and consequently advance the conveyor 1—at a speed greater than that imparted thereto by the motor 27. Such sudden, but momentary, part-rotation of the shaft, and corresponding fast advance of the conveyor, is in the form of a jerk so that when a slice 12 drops onto the upper run of the conveyor immediately behind the last slice of the formed group 13, a gap 44 is left on said run between said group 13 and the first slice 12 of the next group to be formed on the conveyor.

Such gapping or spacing of the bacon groups makes it easier for the workers to recognize and separately handle such groups as they leave the conveyor on bars 45 or the like at the discharge end of said conveyor.

The extent of the gap between adjacent bacon groups 13 is predetermined by the length of the power-actuated stroke of the piston rod 35; the stroke being variable by adjustment of the sleeve 38, as previously described. It will be understood that the smaller the arc of suddenly speeded-up rotation of the shaft 17 may be, the smaller will be the extent of the gaps 44 formed between adjacent bacon groups 13 on the conveyor, and vice-versa.

The number of slices 12 in each group 13 is, of course, controlled by the frequency of operation of the timing device 43.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A sliced bacon conveying and spacing apparatus comprising, with a constantly operating bacon slicing machine, an endless conveyor having a generally horizontal upper run onto one end of which the slices as formed are fed at a constant speed in transversely extending and normally overlapping relation as the conveyor advances, the conveyor having a drive shaft, means to drive the shaft at a constant speed, and a device acting on the shaft to suddenly increase the speed of the shaft for short and evenly spaced periods whereby to form gaps on said upper run of the conveyor between adjacent groups of overlapping bacon slices thereon; the shaft drive means including a normally engaged but overrunning type driving clutch on the shaft, and said device comprises another but normally disengaged overrunning type clutch on the shaft; the clutches overrunning in the same direction, and intermittently functioning means connected to said other clutch to engage the same and momentarily drive the shaft at a speed greater than that imparted thereto by the first named clutch.

2. Apparatus, as in claim 1, with means included with the last named means to adjust the arcuate extent of rotation of the shaft by said other clutch.

3. Apparatus, as in claim 1, in which said other clutch includes an outer drive member, an arm projecting radially from said member, a compressed air cylinder disposed at an angle to the arm, a piston rod projecting from the cylinder and operatively connected to the arm to swing the same and rotate said member through an arc of predetermined extent upon advance of the piston rod, and timed actuating means to control the admission of air to the ends of the cylinder in quick succession and at predetermined intervals.

4. Apparatus, as in claim 3, in which the last named means comprises, with an air supply conduit leading to the cylinder, a valve interposed in the conduit, an electrically actuated device connected to the valve to operate the same, a circuit for said device, and an electrically actuated timer interposed in the circuit.

5. Apparatus, as in claim 3, in which the operative connection of the piston rod with the arm comprises a clevis connecting the piston rod to the arm so that the latter may be swung to rotate said member through an arc of predetermined extent upon advance of the piston rod, means to control the admission of air to the ends of the cylinder in quick succession and at predetermined intervals, and a longitudinally adjustable sleeve mounted on and projecting from the cylinder in surrounding relation to the rod and normally engaging the clevis.

References Cited in the file of this patent

UNITED STATES PATENTS

| Re. 24,103 | Meyer | Dec. 20, 1955 |
|---|---|---|
| 1,112,184 | Allison | Sept. 29, 1914 |
| 1,979,207 | Milmoe | Oct. 30, 1934 |